April 12, 1960
J. C. WILSON ET AL
2,932,586
METHOD OF PREPARING COPOLYMER OF SILANOLS AND
ISOCYANATOSILANES, RESULTANT COPOLYMER AND
METHOD OF COATING THE INTERIOR OF
CONTAINERS THEREWITH
Filed Jan. 16, 1956
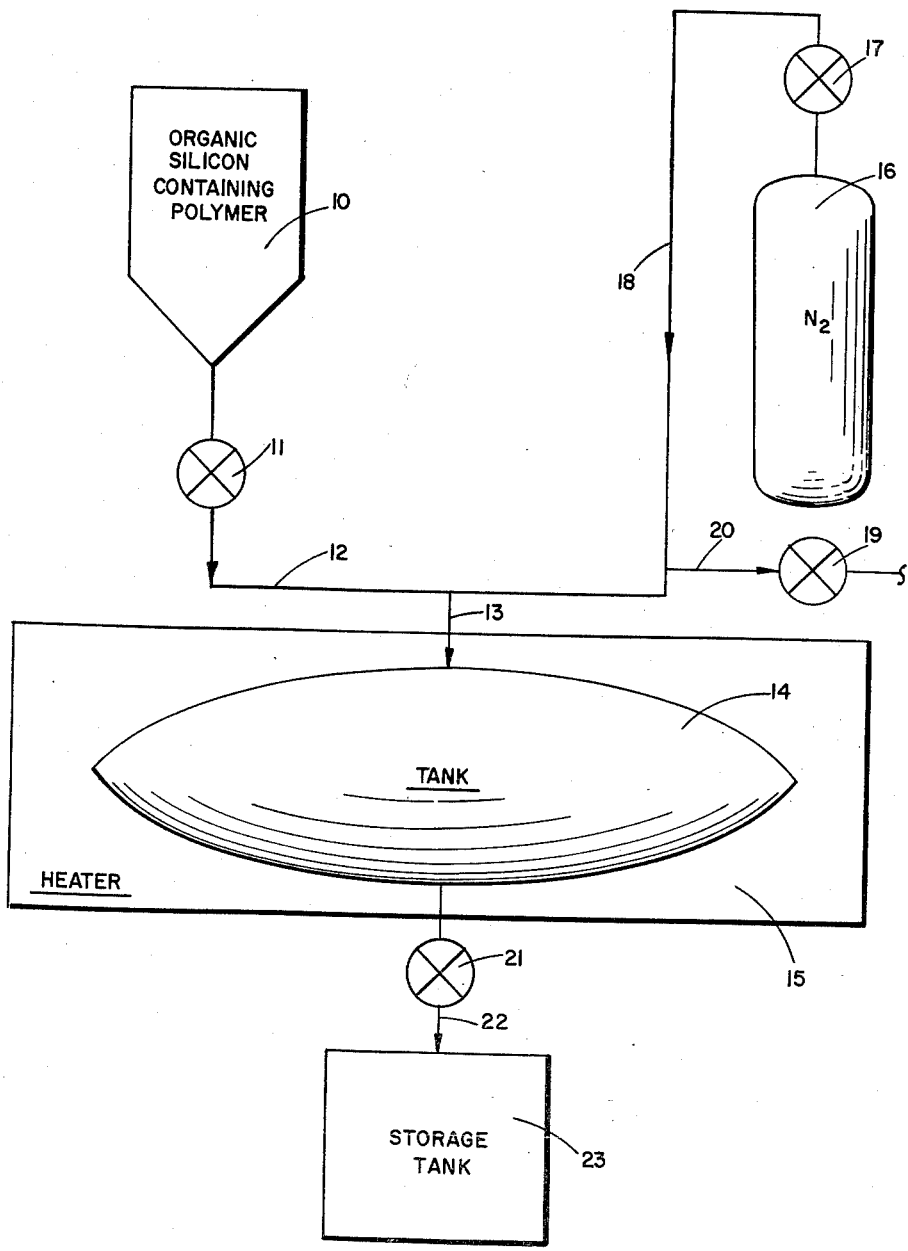
INVENTORS
JARDINE C. WILSON
MAX A. NADLER
IRVING KATZ
ALPHONSE WALTI
BY Thomas S. MacDonald
ATTORNEY

United States Patent Office 2,932,586
Patented Apr. 12, 1960

2,932,586

METHOD OF PREPARING COPOLYMER OF SILANOLS AND ISOCYANATOSILANES, RESULTANT COPOLYMER AND METHOD OF COATING THE INTERIOR OF CONTAINERS THEREWITH

Jardine C. Wilson, Los Angeles, Max A. Nadler, Whittier, Irving Katz, Long Beach, and Alphonse Walti, Fullerton, Calif., assignors to North American Aviation, Inc.

Application January 16, 1956, Serial No. 559,104

19 Claims. (Cl. 117—97)

This invention relates to a novel composition of matter. In particular, this invention relates to novel silicon-base elastomers and a method for their preparation.

In the field of polymer chemistry, a great number of plastics have been prepared having certain specific properties which make them useful for different purposes. One of the functions of plastics is that of coating metal surfaces to seal minute openings and imperfections. For example, polymeric coatings are found advantageous for covering the inner surfaces of liquid containers made of metal. A sealant is especially desirable for the inner surface of a metal container which is manufactured by welding together a number of metal sections, with possibly a number of reinforcing members also being riveted to the walls of the container. Imperfections in the weld and/or damage at the point of riveting often leave minute holes in the surface through which the contained fluid can escape. This results not only in a loss of the contents but also endangers the surroundings if the escaping fluid is corrosive and/or explosive. This hazard is magnified when the container is subjected to continuous and varying stress and strain, as is the case with high speed aircraft fuel tanks while in service. None of the polymer or plastic compositions, known in the art, have been found to possess the required high temperature resistant properties to serve as a sealant for containers for aliphatic and aromatic hydrocarbon fuel. A need existed therefore for a composition of matter which can readily be applied to the relatively inaccessible inner surfaces of containers having small openings, and which can be cured to form a thermally and chemically stable, and relatively insoluble coating to serve as a sealant on the inner surface.

It is therefore an object of the present invention to provide a novel polymer composition.

It is likewise an object of this invention to provide a novel silicon-base polymer composition.

It is also an object of this invention to provide new composition of matter which can be readily applied to relatively inaccessible inner surfaces of containers for liquids and gases.

Another object of this invention is to provide a silicon-base polymer which can readily be applied to a surface as a sealant.

It is likewies an object of this invention to provide a sealant which is thermally stable at elevated temperatures as well as resistant to solvent action of aliphatic and aromatic hydrocarbon fuels.

Another object of the present invention is to provide a process for the preparation of the novel silicon-base polymers.

The above and other objects of this invention are accomplished by providing a silicon-containing polymer obtained by co-polymerizing a silanol with an isocyanatosilane. An embodiment of our invention is providing an organic silicon-containing polymer obtained by co-polymerizing a mixture of silanols and isocyanatosilanes wherein at least one component in the co-polymerization mixture has a hydrocarbon substituent on the silicon atom, having from 1 to about 20 carbon atoms. Another embodiment of our invention comprises providing an organic silicon-containing polymer obtained by co-polymerizing (1) a dihydrocarbon-substituted silanediol having the general formula RR'Si(OH)$_2$ with (2) at least 1 mol-percent, based on the amount of the dihydrocarbon-substituted silanediol, of a dihydrocarbon-substituted diisocyanatosilane having the general formula $$R''R'''Si(NCO)_2$$

wherein R, R', R'' and R''' can be the same or different and represent hydrocarbon groups having from 1 to 20 carbon atoms. An example is the co-polymerization of dimethyldiisocyanatosilane, $(CH_3)_2Si(NCO)_2$, and diphenylsilanediol, $(C_6H_5)_2Si(OH)_2$, to produce the novel silicon-containing polymer of this invention.

The amount of (2), the dihydrocarbon-substituted diisocyanatosilane, in the polymer can vary from 1 to 100 mol-percent based upon the amount of (1) the dihydrocarbon-substituted silanediol present. Thus, the molar ratio of (1):(2) can vary from 100:1 to 1:1. It is found that the presence of at least 1 mol-percent of the diisocyanatosilane is sufficient to impart a measure of thermoplasticity to the polymer. For better results, however, it is advisable to employ from 25 to 100 mol-percent of the diisocyanatosilane in the polymer composition, representing a molar ratio of (1):(2) of from 4:1 to 1:1. A preferred embodiment of this invention is an organic silicon-containing polymer, hereinafter referred to as a silicon-base polyurethane polymer or elastomer, obtained by co-polymerizing (1) a dihydrocarbon-substituted silanediol with (2) from 75 to 100 mol-percent of a dihydrocarbon-substituted diisocyanatosilane, representing a molar ratio of (1):(2) of from 4:3 to 1:1. An elastomer having this composition gives satisfactory results when used in sealing compositions. An especially preferred composition is one in which the amount of (2) dihydrocarbon-substituted diisocyanatosilane is 100 mol-percent, based on the amount of (1) hihydrocarbon-substituted silanediol employed, i.e., a molar ratio of (1):(2) of 1:1. An elastomer of the latter composition has the best properties for use as a sealant.

The polymer composition of this invention is a colorless substance which becomes more fluid (prior to cure) as the content of the dihydrocarbon diisocyanatosilane is increaesd in the polymerizing mixture. The elastomer obtained when the 1:1 molar mixture is reacted, for example, is a colorless nonviscous liquid when first formed at low temperatures. It is called the prepolymer. This liquid hardens into a solid impervious mass upon heating.

The hydrocarbon groups referred to above can be alkyl groups having both straight and branched-chains. They can also be cycloalkyl groups; and aryl, alkaryl and arylkyl groups. The aryl groups can have from 1 to 3 condensed rings in the aromatic nucleus as represented by benzene, naphthalene, anthracene and phenanthrene. Nonlimiting examples of compounds which are employed in preparing the novel compositions of this invention are: dimethyldiisocyanatosilane, dipropyldiisocyanatosilane, di-tert.-butyldiisocyanatosilane, butyl-octyl-diisocyanatosilane, didodecyldiisocyanatosilane, dieicosyldiisocyanatosilane, di(2,4 - dimethylcyclohexyl)diicyanatosilane, diphenyldiisocyanatosilane, dixylyldiisocyanatosilane, methyl-naphthyl-diisocyanatosilane, methylnaphthyl-decylnaphthyl-diisocyanatosilane, hexylanthryl-diisocyanatosilane, diethylsilanediol, dieicosylsilanediol, dicyclohexylsilanediol, ditolylsilanediol, di(diphenyl)silanediol, dianthrylsilanediol, etc. These compounds are prepared by methods well known in the art. For example, dimethyldiisocyanatosilane is prepared by reacting dimethyldichlorosilane with silver isocyanate according to the method of Forbes and Anderson, J.A.C.S. 70, 1222 (1948). Diphenylsilanediol is prepared by hydrolyzing diphenyldichlorosilane, as shown in a text called "An Introduction to the Chemistry of the Silicones" by Eugene G. Rochow, 2nd ed., 1951, published by John Wiley and Sons, Inc., New York. Examples of different products that are obtained when the dihydrocarbon-substituted diisocyanatosilane and the dihydrocarbon-substituted silanediol compounds are co-polymerized in different proportions are illustrated in the examples given below.

In general, the silicon-base polyurethane polymers or elastomers are prepared by a process comprising reacting a dihydrocarbon-substituted silanediol having the general formula $RR'Si(OH)_2$, with from 1 to 100 mol-percent dihydrocarbon-substituted diisocyanatosilane, having the general formula $R''R'''Si(NCO)_2$ wherein the R's are hydrocarbon radicals having from 1 to 20 carbon atoms. The process is carried out at a temperature of from 0° to 450° C. The reaction at 0° C. is relatively slow and is not preferred. When temperatures of 450° C. are employed, a cured polymer is produced. For best results, it is preferred to carry out the first step of the process at a temperature of from 30° to 130° C. This yields what is called a prepolymer, which upon further heating, with or without the addition of other substances such as fillers and/or catalysts, results in a finished polymer of an elastomeric or resilient nature having substantial heat-resistant properties. It is, therefore, an embodiment of the present invention to prepare silicon-base polyurethane polymers by reacting dihydrocarbon-substituted diisocyanatosilane compounds with dihydrocarbon-substituted silanediol compounds at temperatures of from 0° to 130° C. for a period of from 0.1 to 20 hours followed by heating at a reaction or curing temperature of from 100° to 450° C. for a period of from 0.1 to 40 or more hours.

The property of the novel silicon-base elastomer is improved by adding a filler to the liquid composition in order to give it more body when heated or cured at higher temperatures. The addition of the filler improves the heat resistance, mechanical strength and handling properties of the polymer. The filler can be any of the substances known in the art as useful for this purpose. Illustrative examples of different fillers are: a mixture of the minerals of the mica group; powdered metals and their oxides such as silica, alumina, copper leafing powders, etc. In other words, the filler or modifier can consist of at least one substance selected from the group consisting of the elements of groups I-IV, VB, VIB, VIIB and VIII having atomic weights from 26 to 190, their oxides, and their silicates. This includes the different minerals containing the above substances such as the various mica minerals, etc. The particle size of the filler material can vary from 1 to 1000 microns.

The amount of the filler or modifier employed in our new composition can vary from 0 to 300 weight percent. When as little as 1 weight percent of filler is employed, it is found that the durability of the resulting plastic has been improved. When 300 weight percent of the filler is employed, the product, upon curing at elevated temperatures, is found to be a high heat-resistant solid plastic. Of the different fillers mentioned above, it is found that a mixture of kaolin and black mica gives very good results and constitutes a preferred embodiment of this invention. While various amounts of filler may be employed, it is found that 10 to 65 weight percent of filler, based upon the amount of silicon-base polymer, provides a preferred composition for use as sealant for metal surfaces. Coatings containing this amount of filler are found to seal minute openings in metal surfaces and withstand temperatures as high as 500° C. without becoming brittle.

The preparation is facilitated by conducting the reaction in the presence of a solvent selected from the group consisting of hydrocarbons, hydrocarbon ethers, hydrocarbon ketones, and the halogenated derivatives thereof, having from 3 to about 24 carbon atoms. The hydrocarbon portions of the solvent compounds are radicals which can be alkyl, cycloalkyl, aryl, arylkyl and alkaryl. Illustrative examples of the various solvent ethers are: diethyl ether, diisopropyl ether, dibutyl ether, didodecyl ether, diphenyl ether, methyl phenyl ether, ethyl naphthyl ether, dioxane and tetrahydrofuran. Examples of ketone solvents are acetone, methyl ethyl ketone, methyl phenyl ketone, ethyl naphthyl ketone and dodecyl phenyl ketone. Examples of hydrocarbons which serve as solvents are: cyclohexane, octane, dodecane, eicosane, phenyl ethane, benzene, toluene, xylene, tert.-butylbenzene, dodecylbenzene, tetrahydronaphthylene, ethylanthracene, etc. Nonlimiting examples of the chlorinated derivatives of the above solvents which can be employed are chloropentane, dichlorobenzene, bromonaphthylene, di(4-chlorobutyl) ether, di(2-bromoethyl)-ketone, etc.

It is found advantageous to employ a catalyst in the preparation of our novel silicon-base polymers. The use of the catalyst serves not only to improve the process but also to improve the quality of the silcon-base polymer with respect to stability and resiliency. Suitable catalysts for this purpose are hydrocarbon peroxides having the general formula $ROOR'$, organic peracids and their esters having the general formula $RCO.O.OR''$, organic acid peroxides having the general formula $RCO.O_2.OCR'$, and amines, having the general formula $R'''R^{IV}R^VN$. The R and R' represent hydrocarbon groups as outlined hereinabove, having from about 2 to about 24 carbon atoms. The preferred number of carbon atoms is from 2 to about 12. R'' can be an H-atom or a hydrocarbon group of the same nature as R. R''', $R^{IV}$ and $R^V$ can be the same or different and can be hydrocarbon groups such as R which can also have other substituents thereon such as OH-groups for example. The R is as defined above. In addition, $R^{IV}$ and $R^V$ can also be H-atoms. The use of the catalysts, besides improving the quality of the polymer, has the added advantage of causing the prepolymer containing the catalyst to harden into a firm but resilient elastomer or polymer at a lower curing temperature.

The amount of catalyst employed can vary from 0.1 to 20 weight percent based on the amount of silicon compounds used in the preparation. It is usually found that 0.1 weight percent of the catalyst is sufficient to impart a noticeable improvement to either the process or the finished product or both. Amounts of catalyst in excess of 20 weight percent do not appear to contribute substantially to the beneficial properties. Amounts of catalyst between 1 and 15 weight percent produce the greatest benefits with respect to cutting down side reactions, reducing the temperature and length of time required for curing, and improving the overall stability of the product. The use of amounts of catalyst within this latter range, therefore, constitutes a preferred embodiment of this invention.

When the amines, $R'''R^{IV}R^VN$, are employed as the catalyst in the formation of the prepolymer, it is found that the best results are obtained when the R's are aryl groups and alkyl groups having aryl substituents on the carbon atom alpha to the nitrogen. Examples of such amine catalysts are triphenylamine, tribenzylamine, di-(phenyl)benzylamine, naphthyl dibenzylamine, etc. Examples of amine catalysts employed in the curing of the polymer are ethylamine; diethylamine; triethylamine; mono-, di- and tri-propylamine; mono-, di-, and tri-phenylamine; ethanolamine; diethanolamine; triethanolamine; triphenolamine; tridodecylamine, etc. Examples of hydrocarbon peroxides employed are diethylperoxide, di-tert.-butylperoxide, didodecylperoxide, etc. When organic peracids and their esters are employed they can be acids such as peracetic acid, perbenzoic acid, perdodecanoic acid, tert.-butyl peracetate, and the like. The acid peroxides which can be employed are acids such as acetyl peroxide, benzoyl peroxide, hexanoyl peroxide, dodecanoyl peroxide, hexadecanoyl peroxide, etc.

It is thus seen, from the above, that an embodiment of this invention is an organic silicon-containing polymer composition comprising a major proportion of a copylymer obtained by co-polymerizing (1) a dihydrocarbon-substituted silanediol having the general formula $$RR'Si(OH)_2$$

with (2) at least 1 mol-percent, based on the amount of the hydrocarbonsilanediol of a dihydrocarbon-substituted diisocyanatosilane having the general formula $$R''R'''Si(NCO)_2$$

wherein the R's represent hydrocarbon groups having from 1 to about 20 carbon atoms; and from 0.1 to about 20 weight percent based on the amount of polymer, of a catalyst selected from the group consisting of hydrocarbon peroxides, organic peracids, organic acid peresters, organic acid peroxides, and amines, having from 2 to about 24 carbon atoms.

The following examples more clearly illustrate the compositions and process of this invention. The proportions are given in percent by weight except where otherwise specified.

Example I

To a reaction vessel equipped with means for charging and discharging liquids, solids and gases, heating and cooling means, means for measuring temperature and pressure, and means for agitation, were added 21.6 parts of diphenylsilanediol, 14.2 parts of dimethyldiisocyanatosilane representing 100 mol-percent of this compound based on the diphenylsilanediol, one part of triphenylamine, and 80 parts of dioxane. The molar ratio of diphenylsilanediol-to-dimethyldiisocyanatosilane in this instance was 1:1. The contents of the vessel were heated to reflux temperature under a nitrogen atmosphere, and maintained at reflux temperature for two hours to give a colorless liquid product, called the prepolymer. This polyurethane prepolymer was separated from small amounts of solid side reaction products by vacuum filtration. The prepolymer had a viscosity of about 100 cps. units at 25° C. as determined by a Brookfield Synchrolectric viscometer.

The procedure of Example I was repeated, leaving out the triphenylamine catalyst. The product had essentially the same appearance. The only difference noted was that a longer subsequent curing period was necessary to produce the cured polymer.

Example II

The procedure of Example I is followed employing 120 parts of diethylsilanediol, 2.6 parts of diphenyldiisocyanatosilane representing one mol-percent based on the amount of dimethylsilanediol employed, plus 100 parts of a 50–50 mixture of benzene and xylene. The molar ratio of dimethylsilanediol-to-diphenyldiisocyanatosilane in this case is 100:1. The mixture is heated to and maintained at reflux temperature for two hours to produce a copolymer composition.

Example III

The procedure of Example I is followed employing 244 parts of dibenzylsilanediol, 39 parts of methyl-ethyl diisocyanatosilane representing 25 mol-percent based on the silanediol compound, and 90 parts of tetrahydrofuran as a solvent. The mixture is maintained at reflux temperature for a period of three hours to produce a polyurethane prepolymer.

When the process of Example III is repeated with 14 parts of tribenzylamine catalyst, which represents five weight percent based on the amount of the silicon compounds employed, a co-polymer is obtained which is more readily cured.

Example IV

The procedure of Example I is followed in reacting 21.8 parts of ethyl naphthyl silanediol, 22.6 parts of octyl phenyl diisocyanatosilane representing 75 mol-percent based on the amount of silanediol compound, 50 parts of methyl ethyl ketone and 45 parts of toluene. The reaction mixture is heated to reflux temperature and refluxed for a period of three hours. The solvent is removed by distillation under reduced pressure. The prepolymer is then heated to 441° C. for a period of five hours, which causes it to set into a firm but resilient mass.

Similar results are obtained when the prepolymer obtained is subjected to a temperature of 450° C. for four hours.

Example V

The procedure of Example I is followed except that the reaction is carried out in a pressure-resistant vessel, employing 21.6 parts of diphenylsilanediol, 14 parts of dihexyldiisocyanatosilane representing 50 mol-percent based on the silanediol compound, 0.036 part of naphthyl-diphenylamine, 40 parts of chloronaphthylene, and 40 parts of di(4-bromobutyl) ether. The reaction mixture is maintained at 20° C. under a pressure of 400 p.s.i. in a nitrogen atmosphere for about 40 hours to produce a polyurethane polymer.

The procedure of Example V is repeated under a pressure of 10 p.s.i. at 150° C. for a period of three hours to produce a polymer of this invention. When the reaction is conducted at 200 atmospheres at 0° C. for a period of 20 minutes, polymer formation also occurs. Pressures as high as 1,000 atmospheres can be used.

Example VI

A copolymer is prepared according to the procedure of Example I, by reacting 12 parts of diethylsilanediol with 33.6 parts of ditetrahydronaphthyl-diisocyanatosilane representing 90 mol-percent based on the amount of the silanediol used, in 75 parts of dioxane at reflux temperature for three hours.

Example VII

A hybrid silicon-base polyurethane was prepared by the process of Example I employing 3.1 parts of ethylene glycol and 14.2 parts of dimethyl diisocyanatosilane, in 18 parts of castor oil. The reaction mixture was heated to 90° C. and maintained at that temperature for a period of 30 minutes to yield a liquid polymer.

Prepolymer compositions containing a filler or modifier are prepared in the following manner:

Example VIII

To two parts of the composition obtained in Example I was added one part of a mixture of finely divided kaolin, $Al_2O_3 \cdot 2SiO_2$, and black mica, $$(K, H_2)(MgFe)_2(AlFe)_2(SiO_4)_3$$

in which the ratio of the elements Si:Mg:Fe:Al:Ca:Na:K in parts by weight was 32.0:1.5:5.0:11.0:0.80:0.87:0.43. The mixture also contained traces of other elements. The particle size of the kaolin-mica mixture ranged from about 3 to about 100 microns in diameter. The components were thoroughly agitated by a stirring means until a homogeneous mixture resulted.

In like manner a mixture of 25 parts of the composition of Example I and one part of silica, $SiO_2$, having a particle size of from about 3 to about 100 microns, was prepared.

Similarly, a composition containing ten parts of the prepolymer obtained in Example I and 6.5 parts of copper leafing powder is prepared.

Example IX

To 100 parts of the composition of Example VI are added one part of titanium dioxide powder having a particle size within the range of from 3 to about 1000 microns in diameter, and the components thoroughly mixed until a homogeneous mixture results.

Example X

To one part of the polymer obtained in Example V, are added three parts of an equimolar mixture of zinc oxide and magnesium silicate. The components are thoroughly mixed until a homogeneous mixture results. The composition is then placed in a mold measuring 2 cm. x 2 cm. x 10 cm. and heated to 373° C. to produce a hard polymeric composition.

Polymer compositions containing a catalyst are prepared as follows:

Example XI

To a prepolymer prepared by co-polymerizing 21.6 parts of diphenylsilanediol and 14.2 parts of diethyldiisocyanatosilane at 101° C. in a dioxane solvent according to the procedure described in Example I, was added 10 weight percent of triethanolamine. The mixture was agitated until a homogeneous solution resulted.

Following the procedure of Example XI, compositions were prepared in which the triethanolamine was replaced by 10 weight percent di-tert.-butyl peroxide, 10 weight percent tribenzylamine, and 10 weight percent of tert.-butyl peracetate, respectively.

In like manner compositions are prepared by: (a) mixing 0.1 weight percent peracetic acid with the polymer composition obtained in Example II; (b) mixing 1.0 weight percent perdodecanoic acid with the composition obtained in Example IX; (c) mixing 20 weight percent amylperbenzoate with the composition of Example III; (d) mixing 15 weight percent didodecyl peroxide with the composition of Example IV.

Example XII

The composition obtained in Example I was mixed with 10 weight percent tribenzylamine, based on the amount of the prepolymer employed. The mixture was thoroughly agitated until a homogeneous mixture resulted.

In like manner 10 weight percent di-tert.-butyl peroxide was mixed with the composition of Example I. Likewise, 10 weight percent tert.-butyl peracetate is mixed with the composition of Example VIII to produce the novel composition of our invention containing the catalyst of the type specified hereinabove. Also, by following the procedure of Example XII, 5 weight percent of octylamine is mixed with the composition of Example X to provide a composition of our invention.

In order to test the resistance of the polymer of our composition to solvent action of various hydrocarbons, the following procedure was followed.

Example XIII

A metal strip having the dimensions 2" x 6" x 1/32" was coated to a thickness of about 1/1000 of an inch (1 mil), with the prepolymer composition obtained in Example I. The coated metal strip was then subjected to a temperature of 220° C. for a period of one hour, followed by four hours at 282° C. The polymer of the metal strip was transformed to an elastomeric transparent coating by this treatment. The coated strip was then immersed in JP-5 fuel which is a jet hydrocarbon fuel, approximately 25 percent of which is composed of aromatic compounds. The coating on the metal strip was found to be unaffected after seven days immersion in the fuel.

A coating prepared in the same manner from the composition obtained in Example VIII was likewise unaffected by hydrocarbon fuels.

Example XIV

A metal strip was coated with the hybrid polymer composition obtained in Example VII by reacting ethylene glycol with dimethyl-diisocyanatosilane. The coated strip was maintained at a temperature of about 23° C. for a period of 30 minutes. During this period, the film was transformed to a white amorphous powder which upon heating to a temperature of 282° C. turned to a sintered brownish mass. When the strip with this coating was immersed in JP-5, the coating was found to be vigorously attacked by the solvent.

In like manner a coating composed of a polymer formed from diphenylsilanediol and hexyldiisocyanate is vigorously attacked by fuels due to the solvent action of hydrocarbons. Thus only the compositions of this invention, namely, polymers obtained by co-polymerizing dihydrocarbon substituted silanediols with dihydrocarbon substituted diisocyanatosilanes are suitable for use as coatings for surfaces which are exposed to hydrocarbon fuels.

The resistance of the coatings prepared from our polymers to the action of fuels at high temperatures was determined as follows:

Example XV

A strip of metal coated with the composition of Example I was exposed to JP-5 fuel in each of two sealed steel vessels containing the liquid fuel in equilibrium with its vapor. One of the coated metal strips was suspended in the liquid while the other was exposed to the vapor phase. The polymer coating on the sample exposed to the liquid phase at a temperature of 204° C. exhibited a 0.5 percent weight loss over a period of two hours. The polymer film on the sample exposed to the vapor phase at a temperature of 282° C. exhibited a loss of 0.1 weight percent. These losses are relatively low for the period of exposure at such high temperatures. This further indicates the suitability of our polymers as coatings for such objects as the inner surfaces of fuel tanks which may be exposed to high temperatures as is often the case with high speed aircraft.

The sealing capacity of the compositions of this invention was determined in the following manner:

Example XVI

A circular stainless steel panel, 0.020 inch thick, and 4 inches in diameter, was perforated to contain five half-moon-shaped cuts forming an arc of about ½ inch in length and from ½ to 2 thousandths of an inch in width. The panel, or plate, was clamped onto the face of an open container so as to form an enclosure with only an opening for introducing liquids and gases. The container was then partially filled with the composition of Example I and positioned so that the perforated plate was completely covered with the prepolymer. The container was then pressurized to about 10 p.s.i.g. by means of nitrogen gas in order to force the prepolymer into the small openings cut in the test plate. The coated test plate was then detached from the container and subjected to a temperature of 204° C. for a period of one hour, followed by 282° C. for a period of four hours. The plate was then cooled and clamped again onto the open-faced container so as to form an air-tight seal around its periphery. Another container was likewise sealed on the other side of the plate and the chamber formed thereby was connected to a flow meter. The first container into which the coated surface of the plate was exposed was again pressurized with nitrogen gas to 42 p.s.i.g. The leakage through the coated plate into the chamber on the opposite side was measured by means of the flow meter. It was found that no leakage occurred through the polymer-sealed perforations. The plate was then subjected to stress and strain by alternately pressurizing and releasing the pressure on the inside of the container. The plate was then again tested for leakage under a pressure of 42 p.s.i.g. It was found that from one to three cubic inches of nitrogen leaked per minute through the coated plate, as compared to a leakage of 600 cubic inches through the panel before the coating was applied, under the same pressure conditions.

*Example XVII*

The perforated-plate test of Example XVI was next repeated with the composition of Example VIII, containing five weight percent benzoylperoxide. In this case it was found that no leakage occurred through the coated perforations under pressure either before or after subjecting the plate to stress and strain.

Similar results were obtained when the procedure of Example XVII was repeated using the composition of Example IX.

Good results are also obtained when the above perforated plate test procedure was repeated with the composition of Example V containing 0.1 weight percent of tert.-butyl peracetate. The composition of Example III containing 20 weight percent of dibenzaldiperoxide likewise gives good results. This illustrates the advantage obtained by adding a filler or modifier of the type specified hereinabove to form the finished elastomers of our invention, especially when the polymer is used for sealing the inner surfaces of fluid and gas containers.

The silicon-base polymer containing a filler has good sealing characteristics upon being cured on the protected surface at high temperatures. The exposure of the metal to high temperature, however, sometimes adversely affects its mechanical strength. Titanium, for example, becomes brittle when subjected to elevated temperatures for extended periods. It would be desirable, therefore, to modify the composition of the polymer to obtain a sealant which could be cured at lower temperatures. To achieve this, various catalysts were added to the prepolymer with results as indicated in the following examples:

*Example XVIII*

A steel panel was coated with the composition of Example I to which had been added 10 weight percent of triethanolamine. The coated panel was then subjected to temperature of 121° C. for a period of 12 hours. This treatment formed the film into a resilient plastic coating.

The procedure of Example XVIII was repeated except that the heat treatment was carried out at a temperature of 260° C. for a period of 2½ hours. The resilient plastic coating was likewise obtained in this case. When the procedure of Example XVIII was repeated with a composition which had been made without the use of a catalyst in the preparation of the prepolymer, a similar result was obtained.

Subjecting the polymer coated panel to heat at a temperature of 450° C. for a period of 0.1 hour likewise causes it to set into a firm plastic composition. Heating the polymer composition containing the catalyst for a period of about 40 hours at 100° C. also causes the polymer to set.

*Example XIX*

The procedure of Example XVIII was followed, this time using 10 weight percent tert.-butylperacetate as the catalyst with a prepolymer prepared from a 1-to-1 molar ratio of diphenylsilanediol and dimethyldiisocyanatosilane. The polymer film was subjected to a temperature of 110° C. for a period of 20 hours to obtain a firm elastomeric covering on the metal.

When no catalyst is added to the polymer composition, much higher curing temperatures are required in order to obtain a coating which is not subject to attack by hydrocarbon fuels. Even at high temperatures, the presence of a catalyst is often necessary to produce a satisfactory sealant. For example, a prepolymer composed of a 1-to-1 molar ratio of diphenylsilanediol and diphenyl-diisocyanatosilane heat treated at 260° C. for 2.25 hours is unsatisfactory as a sealant. The same polymer to which has been added 10 weight percent tribenzylamine or di-tert.-butylperoxide yields a satisfactory sealant upon heat treatment at 260° C. for the same length of time. Thus, it is seen that the addition of certain catalysts to the prepolymer improves its characteristics since in the absence of the catalyst, even higher temperatures or longer curing periods, or both, may be insufficient to produce a satisfactory sealant.

The polymer composition of our invention is applied to the inner surface of large fuel containers in a manner similar to that described in Example XVI. To illustrate, a fuel tank from a jet aircraft composed of sections of metal welded together is filled with the prepolymer composition of Example VIII containing 10 weight percent di-tert.-butylperoxide and then pressurized with nitrogen gas to 10 p.s.i.g. in order to force the fluid into any and all minute openings. The fluid is then removed from the tank and the tank subjected to elevated temperature treatment of 204° C. for one hour and 282° C. for one hour. After this treatment, the tank is filled with JP-5 fuel and no leakage is observed upon subjecting the contents to pressure at elevated temperatures. In like manner, fuel tanks are coated with the compositions prepared as described in the examples given hereinabove.

The method of coating the inner surface of a fuel container can be explained more fully with reference to the flow diagram given in the figure. In this figure, a hydrocarbon-substituted silanol and hydrocrabon substituted isocyanatosilane copolymer is fed from container 10 through valve 11 in line 12 and through line 13 into fuel tank 14. When the tank is filled with copolymer, valve 11 is closed and valve 17 is opened permitting nitrogen under pressure to flow from nitrogen container 16 through lines 18 and 13 and exert pressure on the fluid in fuel tank 14. When the pressure has been applied for a length of time sufficient to insure that the copolymer has been forced into all crevices and possible leaks in the fuel tank walls, valve 17 is closed and valve 19 is opened to permit excess nitrogen to escape through line 20 and relieve the pressure on the fluid within the fuel tank 14. Valve 21 in line 22 is then opened and the copolymer fluid drained from fuel tank 14 into storage tank 23. Fuel tank 14 with a coating of the copolymer on the inner surface crevices is then subjected to heat provided by heating means 15 to bring about curing and setting of the copolymer as described in Example XVI.

When carrying out the process of preparing the polymers of our invention, it is advisable to purify the dihydrocarbon substituted diisocyanatosilane by distillation before use, as small amounts of impurities cause the deterioration of the reagents as evidenced by the formation of ammonia in the preparation of the prepolymer.

The reaction between the hydrocarbon diisocyanatosilane and hydrocarbon silanediol begins as soon as the two components come in contact with each other. Thus the reaction proceeds at temperatures of from about 0° to about 450° C. The reaction at 0° C., however, is rather slow, while the temperatures near the upper limit cause the reaction to proceed to the point where the polymer is formed into a solid mass. The preferred range of temperature for prepolymer formation is from 30° to 130° C. as it is found that the reaction proceeds at a practical reaction rate within this range to produce a liquid prepolymer. The prepolymer can then be readily handled prior to the formation of the finished polymer, whether it be in the form of solid articles of manufacture or coatings on various surfaces.

The pressure under which the reaction can be carried out can vary from below atmospheric to as high as 1,000 atmospheres or more. However, no great advantage is observed when a pressure either below atmospheric or above 200 atmospheres is employed. Therefore, the preferred pressures under which polymerization is conducted are from atmospheric to about 200 atmospheres.

The process by which our compositions are prepared may be carried out in an atmosphere of air. However, it is sometimes advantageous to use an anhydrous inert atmosphere so as to minimize any deleterious action of moisture upon the isocyanate and the polymer. Suitable atmospheres are the inert gases, such as argon, helium, etc.; nitrogen; hydrocarbons such as methane, ethane, etc.; and the vapors of the solvents employed if any.

The examples given above have been confined to illustrating polymer compositions obtained by co-polymerizing a dihydrocarbon substituted silanediol with a dihydrocarbon substituted diisocyanatosilane. The polymer thus obtained provides a preferred elastomeric composition for use as a sealant. However, other silicon-base polymers are obtained by co-polymerizing a hydrocarbon substituted silanol having from 2 to 4 OH-groups with a hydrocarbon substituted isocyanatosilane having from 2 to 4 isocyanato groups. When monomers having in excess of 2 OH-groups or 2 isocyanato groups are included in the polymerizing mixture, compositions are obtained which tend to be harder and more glass-like in appearance, making them preferable for use in the manufacture of plastic articles rather than as sealants. For example, a dihydrocarbon substituted silanediol such as dimethylsilanediol, is co-polymerized with a hydrocarbon substituted triisocyanatosilane such as phenyltriisocyanatosilane to give a hard plastic upon curing at elevated temperature. In like manner, ethylsilanetriol is co-polymerized with tetraisocyanatosilane. Likewise, di-tert.-butyl diisocyanatosilane is poymerized with tetrahydroxysilane to give a polymeric composition.

A polymer can also be obtained from a mixture containing more than 2 components, as for example, the co-polymerization of 1 mol of dimethylsilanediol with 0.5 mol of diphenyldiisocyanatosilane and 0.5 mol of phenyltriisocyanatosilane. This gives a harder polymeric composition than if the phenyltriisocyanatosilane is omitted. In like manner, a hydrocarbon substituted silanetriol, or tetrahydroxysilane, can be co-polymerized with a dihydrocarbon substituted silanediol and a dihydrocarbon substituted diisocyanatosilane, as for example the co-polymerization of 1 mol of diphenylsilanediol, 1 mol of diphenyl-diisocyanatosilane, with 0.2 mol of hexylsilanetriol.

Trihydrocarbon substituted monohydroxysilanes and monoisocyanatosilanes can be employed in small amounts of say 0.01 to about 5.0 weight percent when co-polymerizing a hydrocarbon substituted silanol with a hydrocarbon substituted isocyanatosilane. Amounts of monoisocyanatosilanes and/or monohydroxysilanes in excess of 5 weight percent can also be used but a large excess is not usually desirable in polymer formation. The monohydroxy and monoisocyanato species function as chain breakers in the polymerization reaction. Therefore, they can be employed to give polymers with a lower average chain length. This has the effect of lowering the cohesive strength of the cured material. An example of this type of polymer is one obtained by co-polymerizing, at 80° C., 1 mol of dibenzylsilanediol, 1 mol of diethyldiisocyanatosilane, 0.25 mol of hexyltrisocyanatosilane, and 0.1 mol of tetrahydroxysilane, together with 0.01 mol of triethylsilanol, to produce a co-polymer which exhibits lower cohesive strength than one prepared in a similar manner but without the triethylsilanol. A somewhat similar composition is obtained when the triethylsilanol is replaced with an equivalent amount of tri(2-phenylpropyl) isocyanatosilane.

Thus it is seen that, in general, silicon-base polymers are obtained by co-polymerizing silanols with isocyanatosilanes. An embodiment of our invention is to provide an organic silicon-containing polymer obtained by co-polymerizing a mixture of silanols and isocyanatosilanes wherein at least one component in the co-polymerization mixture has a hydrocarbon substituent on the silicon atom, said hydrocarbon substituent having from 1 to about 20 carbon atoms as hereinbefore described.

Although the invention has been described and illustrated in detail, it is to be clearly understood that the same is by way of illustration and example only and is not to be taken by way of limitation, the spirit and scope of his invention being limited only by the terms of the appended claims.

We claim:

1. An organic silicon-containing polymer obtained by co-polymerizing at a temperature of from about 0° to about 450° C. (1) at least one dihydrocarbon-substituted silanediol having the general formula $RR'Si(OH)_2$ with at least 1 mol-percent, based on the amount of the hydrocarbon-diisocyanatosilane, of (2) at least one dihydrocarbon-substituted diisocyanatosilane having the general formula $R''R'''Si(NCO)_2$ wherein the R's represent hydrocarbon groups having from 1 to about 20 carbon atoms wherein the molar ratio of (1)-to-(2) is from about 100:1 to about 1:1.

2. The composition of claim 1 wherein the molar ratio of (1)-to-(2) is from about 4:1 to about 1:1.

3. The composition of claim 1 wherein the amount of dihydrocarbon diisocyanatosilane is approximately 100 mol-percent based on the amount of dihydrocarbon-substituted silanediol.

4. An organic silicon-containing polymer composition comprising a major proportion of a copolymer obtained by co-polymerizing at a temperature of from about 0° C. to about 450° C. (1) a dihydrocarbon-substituted silanediol having the general formula $RR'Si(OH)_2$ with from about 1 to about 100 mol-percent, based on the amount of the hydrocarbon-silanediol of (2) a dihydrocarbon-substituted diisocyanatosilane having the general formula $R''R'''Si(NCO)_2$ wherein the R's represent hydrocarbon groups having from 1 to about 20 carbon atoms; and from 0.1 to about 20 weight percent of a catalyst selected from the group consisting of hydrocarbon peroxides, organic peracids, organic acid peresters, organic acid peroxides and amines having from 2 to about 24 carbon atoms.

5. The composition of claim 4 containing a modifier in an amount from 1 to 300 weight percent based on the amount of silicon-base polymer, said modifier consisting of at least one substance selected from the group consisting of the elements of groups IIA, IIB, IIIA, IIIB, IVA, IVB, VB, VIB, VIIB and VIII having atomic weights from 26 to 190, the oxides of said elements, and the silicates of said elements.

6. The process of applying a sealant to the inner surface of containers for fluids and gases comprising filling the container with a silicon-containing polymer of the composition of claim 4, pressurizing the container to about 10 p.s.i.g., removing the fluid from the container and subjecting the container to a temperature of from 100 to 450° C. for a period of from 0.1 to 40 hours.

7. A composition of matter consisting essentially of a silicon-containing organic polymer obtained by co-polymerizing (1) a dihydrocarbon-substituted silanediol having the general formula $RR'Si(OH)_2$ with from 1 to 100 mol-percent, based on the amount of said silanediol, of (2) a dihydrocarbon-substituted diisocyanatosilane having the general formula $R''R'''Si(NCO)_2$, wherein the R's represent hydrocarbon groups having from 1 to about 20 carbon atoms; and a modifier in the amount from 1 to 300 weight percent based on the amount of silicon-containing polymer, said modifier consisting of at least one substance selected from the group consisting of the elements of groups IIA, IIB, IIIA, IIIB, IVA, IVB, VB, VIB, VIIB and VIII having atomic weights from 26 to 190, the oxides of said elements, and the silicates of said elements, said co-polymerization being carried out in the presence of said modifier at a temperature of from about 0° C. to about 450° C.

8. The composition of claim 7 wherein the modifier is present in an amount of from 10 to 65 weight percent based on the amount of silicon-containing polymer.

9. The composition of claim 7 wherein 50 weight percent of a mixture of equal amounts of kaolin and black mica, based on the amount of silicon-base polymer, is present as the modifier.

10. A process for the preparation of a silicon-containing organic polymer comprising heating a dihydrocarbon-substituted silanediol having the general formula RR'Si(OH)$_2$ with from 1 to 100 mol-percent of a dihydrocarbon-substituted diisocyanatosilane having the general formula R''R'''Si(NCO)$_2$ wherein the R's are hydrocarbon radicals having from 1 to about 20 carbon atoms to a temperature of from 0 to 450° C.

11. The process of claim 10 carried out at a temperature of from 30 to 110° C.

12. The process of claim 10 carried out at a temperature of from 20 to 130° C. for a period of from 0.1 to 20 hours followed by a reaction temperature of from 100 to 450° C. for a period of from 0.1 to 40 hours.

13. An organic silicon-containing polymer obtained by co-polymerizing at a temperature of from about 0° C. to about 450° C. (1) at least one silanol selected from the class consisting of dihydrocarbon substituted silanediols and trihydrocarbon substituted silanols, wherein at least about 95 weight percent of said silanols are dihydrocarbon substituted silanediols wherein the hydrocarbon substituents on said silanols have from 1 to about 20 carbon atoms, and wherein the total number of hydroxyl groups and hydrocarbon substituents on the silicon atom of said silanol is 4, with (2) at least one isocyanatosilane, wherein at least about 95 weight percent of said isocyanatosilanes are dihydrocarbon substituted isocyanatosilanes, wherein each of the hydrocarbon substituents on said isocyanatosilanes has from 1 to about 20 carbon atoms, wherein the total number of isocyanato groups and hydrocarbon substituents on the silicon atom of said isocyanatosilane is 4, and wherein the molar ratio of (1)-to-(2) is from about 100:1 to about 1:1.

14. An organic silicon-containing polymer obtained by heating at a temperature of from about 0° C. to about 130° C. for a period of from about 0.1 to about 20 hours followed by heating at a temperature of from about 100° C. to about 450° C. for a period of from about 0.1 to about 40 hours (1) a dihydrocarbon-substituted silanediol having the general formula RR'Si(OH)$_2$ with (2) a dihydrocarbon-substituted diisocyanatosilane having the general formula R''R'''Si(NCO)$_2$, wherein the R's represent hydrocarbon groups having from 1 to about 20 carbon atoms, and wherein the molar ratio of (1)-to-(2) is from about 4:1 to about 1:1.

15. An organic silicon-containing polymer obtained by co-polymerizing at a temperature of from about 0° C. to about 450° C. (1) a dihydrocarbon-substituted silanediol having the general formula R$_1$R$_2$Si(OH)$_2$ wherein each of R$_1$ and R$_2$ contain at least one six-membered aromatic carbon ring therein and contain from about 6 to about 20 carbon atoms, with from about 1 to about 100 mol-percent based on the amount of said dihydrocarbon-substituted silanediol of (2) a dihydrocarbon-substituted diisocyanatosilane having the general formula $$R_3R_4Si(NCO)_2$$

wherein R$_3$ and R$_4$ represent aliphatic hydrocarbon groups having from 1 to about 20 carbon atoms.

16. An organic silicon-containing polymer obtained by co-polymerizing at reflux temperature (1) diphenylsilanediol with from 1 to about 100 mol-percent based on the amount of said diphenylsilanediol, of (2) dimethyldiisocyanatosilane.

17. The composition of claim 16 wherein the molar ratio of (1)-to-(2) is substantially 1:1.

18. The process of preparing a silicon-containing organic polymer comprising heating at reflux temperature diphenylsilanediol with from about 1 to about 100 mol-percent based on the amount of said diphenylsilanediol, of dimethyldiisocyanatosilane.

19. An organic silicon-containing polymer obtained by copolymerizing at a temperature of from about 0° C. to about 450° C. (1) at least one silanol selected from the class consisting of dihydrocarbon substituted silanediols and trihydrocarbon substituted silanols, wherein at least about 95 weight percent of said silanols are dihydrocarbon substituted silanediols, wherein the hydrocarbon substituents on said silanols have from 1 to about 20 carbon atoms, and wherein the total number of hydroxyl groups and hydrocarbon substituents on the silicon atom of said silanol is 4, with (2) at least one isocyanatosilane, wherein at least about 50 mol percent of said isocyanatosilanes are dihydrocarbon substituted isocyanatosilanes, wherein each of the hydrocarbon substituents on said isocyanatosilanes has from 1 to about 20 carbon atoms, wherein the total number of isocyanato groups and hydrocarbon substituents on the silicon atom of said isocyanatosilane is 4, and wherein the molar ratio of (1)-to-(2) is from about 100:1 to about 1:1.

References Cited in the file of this patent

UNITED STATES PATENTS

| | | |
|---|---|---|
| 2,175,373 | Baker | Oct. 10, 1939 |
| 2,511,310 | Upson | June 13, 1950 |
| 2,527,591 | Speier | Oct. 31, 1950 |
| 2,532,559 | Klein | Dec. 5, 1950 |

OTHER REFERENCES

Rochow: "Chemistry of the Silicones," 1951, page 54.

Anderson: "J. Am. Chem. Soc.," vol. 72, No. 1, January 1950, pp. 196–197.